US010788087B2

(12) United States Patent
Battle et al.

(10) Patent No.: US 10,788,087 B2
(45) Date of Patent: Sep. 29, 2020

(54) ONE-WAY CLUTCH WITH SUPPORT SHIM

(71) Applicant: SCHAEFFLER TECHNOLOGIES AG & CO. KG, Herzogenaurach (DE)

(72) Inventors: David Battle, Massillon, OH (US); Kenneth Hunt, Wooster, OH (US); Jordan Geiser, Dalton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 78 days.

(21) Appl. No.: 16/253,843

(22) Filed: Jan. 22, 2019

(65) Prior Publication Data

US 2020/0232525 A1 Jul. 23, 2020

(51) Int. Cl.
*F16D 41/067* (2006.01)

(52) U.S. Cl.
CPC .................................. *F16D 41/067* (2013.01)

(58) Field of Classification Search
None
See application file for complete search history.

(56) References Cited

U.S. PATENT DOCUMENTS 3,700,182 A * 10/1972 Dediemar ................. B02C 4/32 241/230
9,145,927 B2 9/2015 Luipold et al.
2003/0089570 A1* 5/2003 Ochab ..................... F16H 48/19 192/50
2012/0263597 A1* 10/2012 Delapierre ............ F04D 29/266 416/204 A
2017/0167586 A1* 6/2017 Smith ................... F16D 25/126

* cited by examiner

*Primary Examiner* — Colby M Hansen
(74) *Attorney, Agent, or Firm* — Brooks Kushman P.C.

(57) ABSTRACT

An assembly for a one-way clutch (OWC) includes a carrier, an outer race non-rotatably fixed to the carrier, an inner race, and a roller cage assembly. The roller cage assembly is disposed radially between the inner race and outer race to enable relative rotation therebetween. The roller cage assembly has a plurality of rolling elements and an annular cage and is configured to maintain the rolling elements in position. The cage including a flange extending radially inwardly. A support shim has an axial surface that contacts the flange, wherein the support shim is configured to absorb axial forces transmitted through the flange.

20 Claims, 3 Drawing Sheets

10 50 18 54 46 16 40 42 44 48 52 14 66 11 60 12 28 30 68 38 22 26 24 20

ONE-WAY CLUTCH WITH SUPPORT SHIM

TECHNICAL FIELD

The present disclosure relates to one-way clutches for a transmission.

BACKGROUND

One-way clutches and roller one-way clutches are known, particularly in vehicle transmission settings. One-way clutches enable torque to transmit in one rotational direction while inhibiting torque from transmitting in the other rotational direction by disengaging or freewheeling.

SUMMARY

According to one embodiment, a one-way clutch (OWC) includes an inner ring rotatable about an axis. The inner ring has an inner surface that defines splines configured to engage with a shaft, and an outer surface defining an inner race. A OWC carrier assembly is rotatable about the axis and has a carrier having an outer surface with surface features configured to engage with a plurality of clutch plates. The OWC carrier assembly also has an outer support ring defining an outer race, and a hub fixed to the carrier. A roller cage assembly is disposed radially between the inner race and outer race to enable relative rotation therebetween. The roller cage assembly includes a plurality of rolling elements configured to travel radially inwardly and outwardly along ramped surfaces during engagement or disengagement of the OWC, and an annular cage disposed about the axis and configured to maintain the rolling elements in position. A support shim is located axially between the roller cage assembly and the OWC carrier assembly. The support shim is configured to absorb axial forces transmitted between the roller cage assembly and the OWC carrier assembly.

In another embodiment, a one-way clutch (OWC) includes a hub rotatable about an axis, and a carrier rotatable about the axis, non-rotatably fixed to the hub, and having an outer surface configured to engage a plurality of clutch plates. An outer support ring is disposed within the carrier, non-rotatably fixed to the carrier and the hub, and defines an outer race. An inner ring is rotatable about the axis and rotatable relative to the carrier and hub, the inner ring defining an inner race. A roller cage assembly is disposed radially between the inner race and outer race to enable relative rotation therebetween, the roller cage assembly having a plurality of rolling elements and an annular cage disposed about the axis and configured to maintain the rolling elements in position. A support shim contacts at least a portion of the roller cage assembly and is configured to absorb axial forces transmitted from the roller cage assembly.

In another embodiment, an assembly for a one-way clutch (OWC) includes a carrier, an outer race non-rotatably fixed to the carrier, an inner race, and a roller cage assembly. The roller cage assembly is disposed radially between the inner race and outer race to enable relative rotation therebetween. The roller cage assembly has a plurality of rolling elements and an annular cage and is configured to maintain the rolling elements in position. The cage including a flange extending radially inwardly such that the flange at least partially axially overlaps with a portion of the rolling elements. A support shim has an axial surface that contacts the flange, wherein the support shim is configured to absorb axial forces transmitted through the flange.

DETAILED DESCRIPTION

Figure 1:
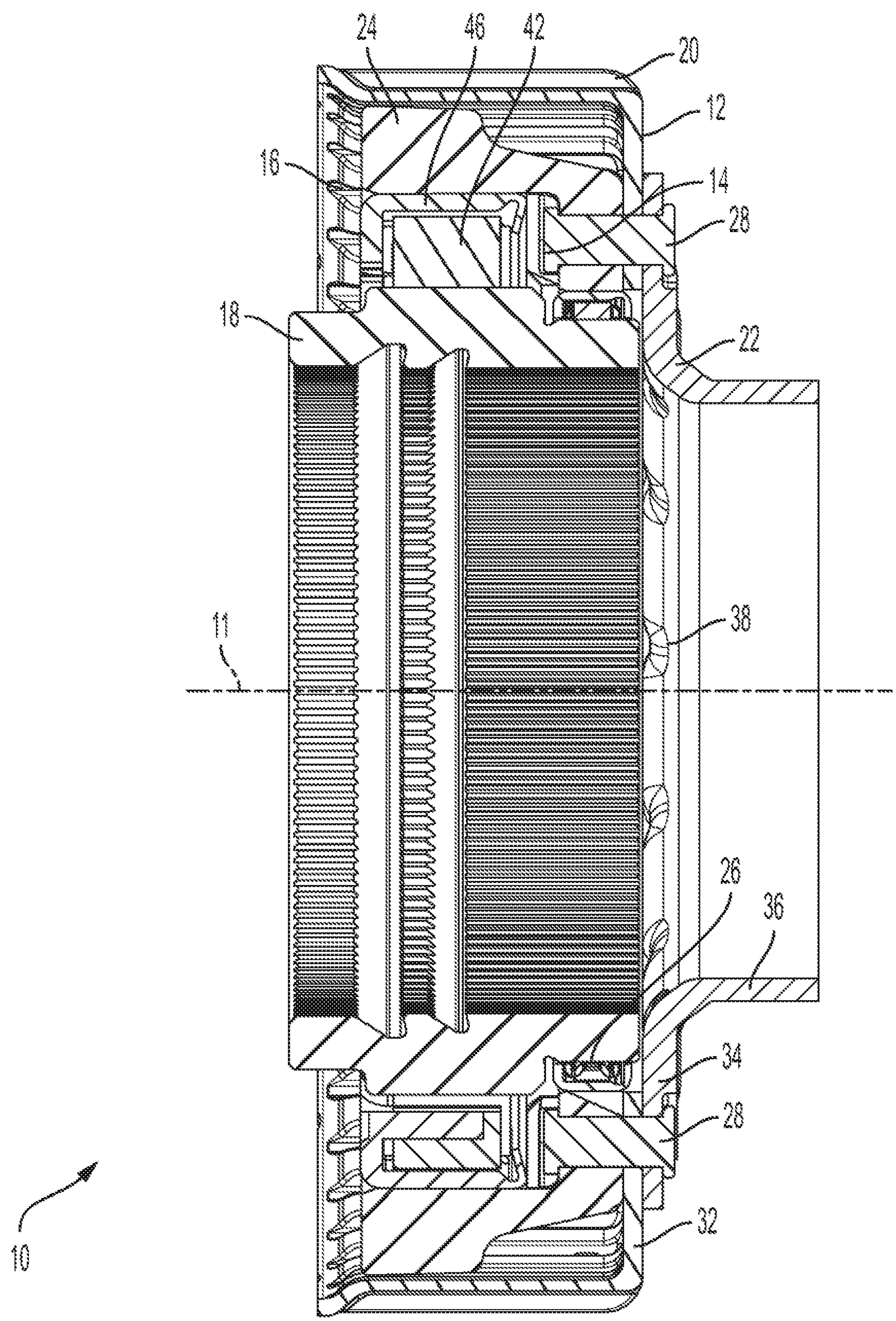
FIG. 1 shows a cross-sectional view of an assembled one-way clutch (OWC), according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein should be understood to be referring to the orientation of the structure depicted in the figures. If an object is said to be extending about an axis, then terms such as “radial” and “axial” are relative to the axis. For example, the “axial” direction is one along or parallel to an axis such as a central axis, and the “radial” direction is normal to the axial direction. An “axial” surface is a surface extending at least partially in the radial direction but located at a particular axial point along the axis. Likewise, a “radial” surface is a surface extending at least partially in the axial direction but located at a particular radial distance from the axis. “Inner” and “outer” also are relative to the axis; for example, an “inner surface” may be a surface facing the axis, and an “outer surface” may be a surface facing away from the axis. Rotation can be relative to the axis. These terms can be used as explained above unless otherwise noted.

One type of one-way clutch (OWC) includes a stamped shell (OWC cartridge) that contains drawn ramps on the inner diameter. The flanges or lips of the cup are formed. Due to the stamp and forming processes, the bottom flange of the OWC cartridge shell can have a thin cross-section which is susceptible to becoming fragile. Axial loading has the potential to cause the bottom flange to break if not treated properly. This would allow the springs and rollers of the OWC to fall out of their respective pockets, causing the OWC to fail.

According to embodiments described below, a OWC is provided with a ring or support shim. The support shim allows one of the flanges (e.g., the bottom flange) of the OWC cartridge to be dead-stopped. The support shim can absorb the axial loading applied to the flange, therefore removing or reducing the possibility of one of the flanges of the OWC cartridge from breaking.

Figure 2:
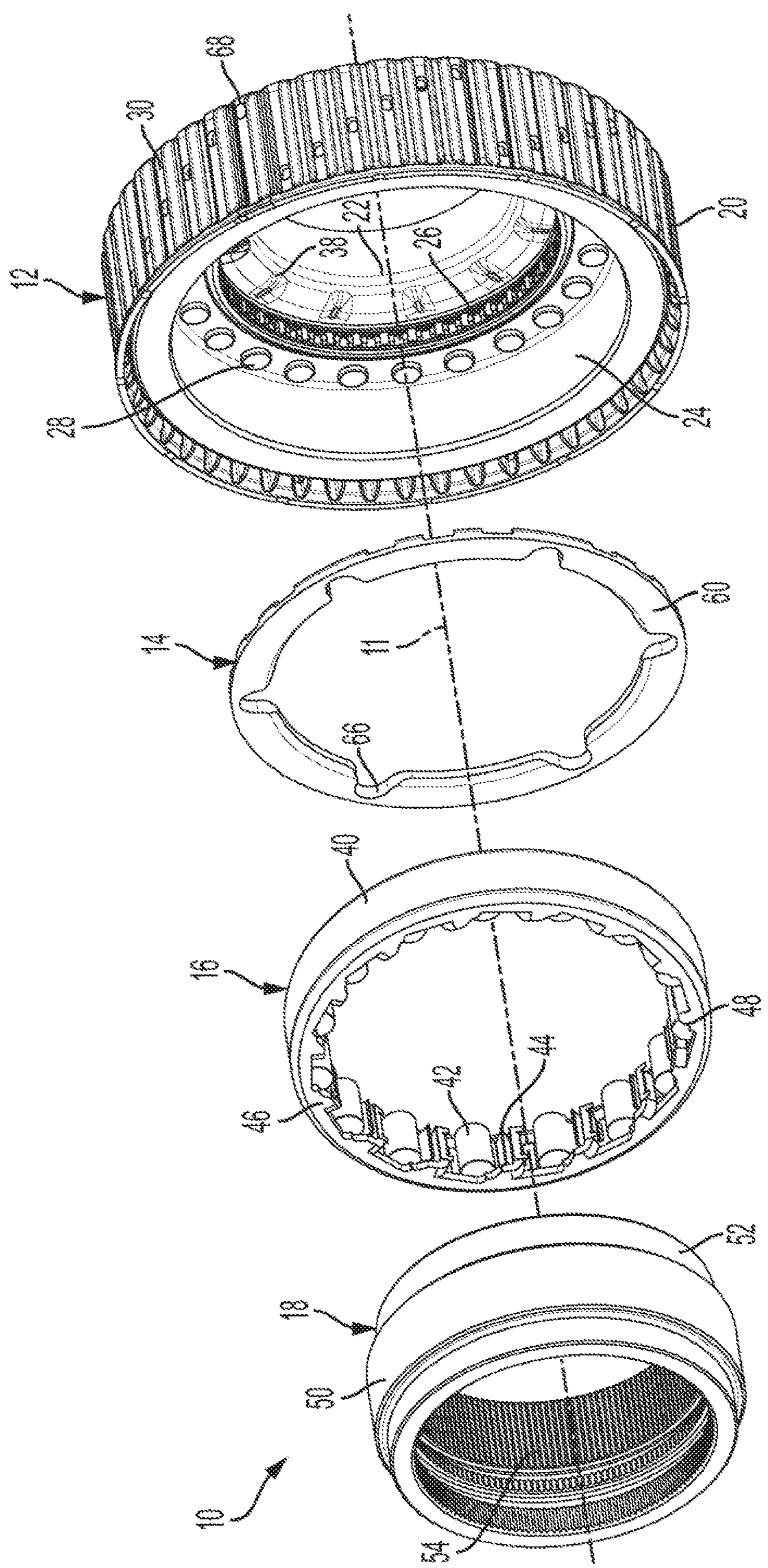
FIG. 2 is an exploded perspective view of the OWC assembly of FIG. 1, according to one embodiment.
Figure 3:
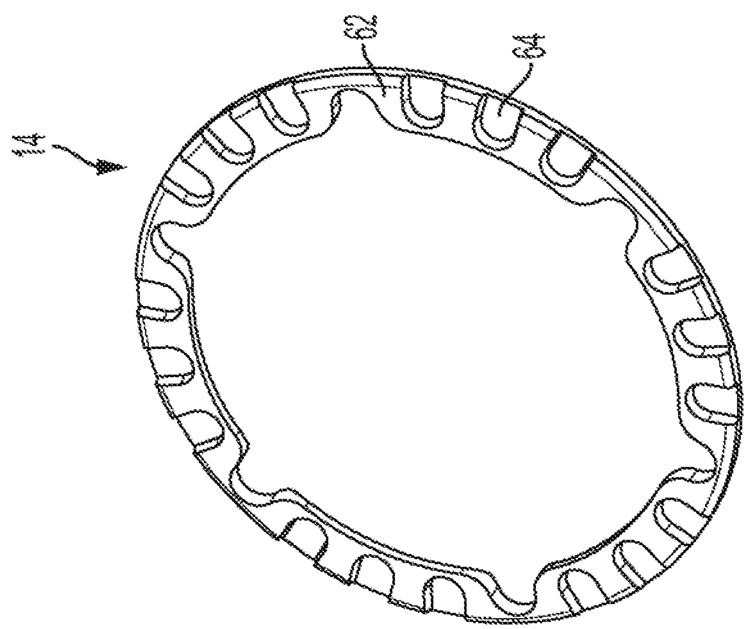
FIG. 3 is a perspective view of a support shim of the OWC assembly shown in isolation, according to one embodiment.

Various figures are shown and referred to below. FIG. 1 shows a cross-sectional view of an assembled clutch, specifically a one-way clutch (OWC) 10, various parts of which can collectively be referred to as an OWC assembly. FIG. 2 is an exploded perspective view of the OWC assembly, showing one side of a support shim 14. FIG. 3 is a perspective view of the support shim 14 in isolation, showing an opposite side of the support shim.

The OWC 10 has various components extending about a central axis 11, including a OWC carrier assembly 12, a support shim 14, a OWC cartridge assembly 16 (also referred to as a OWC sub-assembly or a roller cage assembly), and an inner ring 18. Each of these components or sub-assemblies will be described in more detail below. The OWC carrier assembly 12 includes a carrier 20, a hub 22, an outer support ring 24, and a bearing 26. The carrier 20, the hub 22, and the outer support ring 24 may be fixedly attached, for example by rivets 28 or some other fastener. The rivets 28 may be countersunk within the outer support ring 24 for proper positioning of the OWC cartridge assembly 16, described further below.

The carrier 20 includes an outer surface having surface features such as circumferential undulations 30. The undulations 30 are configured to engage with a plurality of clutch plates (not shown) in a driving engagement. The carrier 20 may also have a radially-extending wall 32 that engages with a corresponding radially-extending wall 34 of the hub via the rivets 28. The outer support ring 24 may be an integral extension of the carrier 20 or may be a separate component fitted within the carrier 20. The outer race 24 provides a surface (e.g., outer race) that engages with the outer surface of the OWC cartridge assembly 16.

The hub 22 may be connected to a transmission component such as a gear (not shown). For example, the hub may include an outer spline on the outer surface of its axially-extending portion 36 for driving engagement with the gear. The hub 22 may include radially-extending slots or grooves 38 configured for lubrication of the bearing 26 and the OWC cartridge assembly 16. The grooves 38 may provide a fluid flow between the hub 22 and the bearing 26. A slight gap may exist axially between the radially-extending portion 34 of the hub 22 and the bearing 26 to enable the lubricant to flow to the bearing 26 via the grooves 38. The grooves 38 may be formed by coining, for example.

The bearing 26 may be a ball bearing capable of carrying radial and axial loads. The bearing 26 may include an outer circumferential surface aligned with an inner circumferential surface of the outer support ring 24 such that the outer support ring 24 is an outer race for both the rolling elements of the bearing 26 and the rolling elements 42 of the OWC cartridge assembly 16. The bearing 26 also includes an inner circumferential surface that contacts an annular surface 52 of the inner ring 18, which is described below. Alternatively, the annular surface 52 may not be provided, and instead the inner circumferential surface of the bearing 26 provides a radial alignment with a transmission shaft (not shown) extending along the central axis 11.

The OWC cartridge assembly 16 may be press-fitted into the outer support ring 24. In particular, the OWC may include a drawn cup with an outer surface 40 that contacts the outer support ring 24. The OWC cartridge assembly 16 may be a cartridge-style roller clutch with rolling elements 42, springs 44, and a ramped outer ring cage 46. The outer surface 40 and the cage 46 may be all part of a singular drawn cup. The cup may be drawn with integrated ramp profiles 48 for allowing the rolling elements 42 to travel partially up the ramps (e.g., radially inwardly along the ramps 48). As can be seen in FIG. 1, the cage 46 may be formed to include a pair of radially-extending flanges that axially bind the rolling elements 42. The springs 44 bias the rolling elements 42 down the ramps (e.g., radially outwardly along the ramps 48). The rolling elements 42 also contact the inner ring 18, namely an annular surface or inner race 50. The inner ring 18 also has another annular surface 52 that is in-board of the inner race 50. The annular surface 52 defines an inner race for the rolling elements of the bearing 26. The inner ring 18 also has an inner spline 54 for engaging a shaft (not shown). In other words, the inner spline 54 may be spline-mated with the shaft such that it rotates with the shaft.

As described above, misalignment has the potential to cause axial loads to overload the OWC cartridge assembly 16 if not handled properly. For example, one of the radially-extending flanges (the flange that wraps around the right-side of the rolling elements 42 in FIG. 1) may be thin when formed. This creates a potential area for fracture if excessive axial loads are placed through the OWC cartridge assembly and there is any misalignment.

The OWC 10 therefore includes a support shim 14. In embodiments, the support shim 14 is an annular ring extending about the center axis. The support shim 14 can be made out of a synthetic material such as a transmission-grade plastic, allowing compliance when the OWC cartridge assembly 16 is dead stopped. This accommodates the design and assembly shown in these Figures, and also prevents the bottom flange (e.g., right-hand side of the cage 46 in FIG. 1) from potentially breaking during installation.

The support shim 14 is configured to absorb axial loading applied to the variation in the rivet heights. The support shim 14 may have a first axial surface 60 that is generally planar and is configured to contact one of the flanges of the axial flanges of the cage 46. The support shim 14 may also have a second axial surface 62 that faces the rivets 28. Arranged annularly about the second axial surface 62 are a plurality of grooves or pockets 64. Each pocket 64 may be aligned with and receive a corresponding one of the rivets 28 such that the end of each rivet 28 extends slightly beyond the second axial surface 62 and toward the first axial surface 60.

Also, arranged annularly about the inner diameter of the support shim 14 are a plurality of indentations or grooves 66. The grooves 66 extend from the inner diameter and radially outwardly, partially toward the outer diameter of the support shim 14, extending entirely axially through the support shim 14 from the first axial surface 60 to the second axial surface 62. These grooves 66 are configured to accommodate the oil flow path through the clutch. For example, the grooves 38 in the hub allow the oil to flow past the hub 22 and between the hub 22 and the inner ring 18, through the bearing 26, through the grooves 66 in the support shim 14, and then through flow holes 68 that can be stamped on the outer portion of the carrier 20. This allows the oil to distribute to the clutch plates (not shown) that are engaged with the undulations 30 of the carrier 20. Some of the oil can also be distributed (e.g., axially) throughout the one-way clutch 10 itself.

The support shim 14 is also configured to rest within a machined groove or surface of the outer support ring 24. Slots in the outer support ring 24 can be provided so oil or lubricant flow through the OWC 10 is not restricted.

When the support shim 14 is assembled within the OWC 10, axial loads can transfer from the OWC cartridge assembly 16 (namely the cage 46), and into the support shim 14. The plastic, deformable nature of the support shim 14 allows the support shim 14 to absorb the axial load, dampening or eliminating the force before it is transferred to the OWC carrier assembly 12 (e.g., the rivets 28).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 one-way clutch (OWC)
11 central axis
12 OWC carrier assembly
14 support shim
16 OWC cartridge assembly
18 inner ring
20 carrier
22 hub
24 outer support ring
26 bearing
28 rivet
30 undulations
32 radially-extending wall
34 radially-extending wall
36 axially-extending wall
38 grooves
40 outer surface
42 rolling element
44 spring
46 cage
48 ramped profile
50 inner race
52 annular surface
54 inner spline
60 first axial surface
62 second axial surface
64 pocket
66 groove
68 flow holes

What is claimed is:

1. A one-way clutch (OWC) comprising:
an inner ring rotatable about an axis and having:
an inner surface that defines splines configured to engage with a shaft, and
an outer surface defining an inner race;
a OWC carrier assembly rotatable about the axis and having:
a carrier having an outer surface with surface features configured to engage with a plurality of clutch plates,
an outer support ring defining an outer race, and
a hub fixed to the carrier;
a roller cage assembly disposed radially between the inner race and outer race to enable relative rotation therebetween, the roller cage assembly including:
a plurality of rolling elements configured to travel radially inwardly and outwardly along ramped surfaces during engagement or disengagement of the OWC, and
an annular cage disposed about the axis and configured to maintain the rolling elements in position; and
a support shim located axially between the roller cage assembly and the OWC carrier assembly, the support shim configured to absorb axial forces transmitted between the roller cage assembly and the OWC carrier assembly.

2. The OWC of claim 1, wherein the support shim includes an axial surface contacting the annular cage.

3. The OWC of claim 2, wherein the annular cage includes a flange that extends radially inwardly to axially cover at portion of the rolling elements, and wherein the axial surface of the support shim contacts the flange.

4. The OWC of claim 1, wherein the support shim is made of a synthetic material.

5. The OWC of claim 1, wherein the support shim includes an inner diameter, an outer diameter, and a plurality of grooves arranged radially about the axis and extend from the inner diameter and partially toward the outer diameter, wherein the grooves are configured to enable oil to flow axially therethrough.

6. The OWC of claim 1, wherein the support shim includes a first axial surface, a second axial surface, and plurality of pockets in the first axial surface that are arranged annularly about the axis.

7. The OWC of claim 6, wherein the OWC carrier assembly includes a plurality of fasteners that fasten the carrier to the hub.

8. The OWC of claim 7, wherein each of the pockets is axially aligned with a respective one of the fasteners.

9. A one-way clutch (OWC) comprising:
a hub rotatable about an axis;
a carrier rotatable about the axis, non-rotatably fixed to the hub, and having an outer surface configured to engage a plurality of clutch plates;
an outer support ring disposed within the carrier, non-rotatably fixed to the carrier and the hub, and defining an outer race;
an inner ring rotatable about the axis and rotatable relative to the carrier and hub, the inner ring defining an inner race;
a roller cage assembly disposed radially between the inner race and outer race to enable relative rotation therebetween, the roller cage assembly having a plurality of rolling elements and an annular cage disposed about the axis and configured to maintain the rolling elements in position; and a support shim contacting at least a portion of the roller cage assembly and configured to absorb axial forces transmitted from the roller cage assembly.

10. The OWC of claim 9, wherein the carrier, the outer race, and the hub are fixedly connected via fasteners, and the support shim includes an axial surface that contacts the fasteners.

11. The OWC of claim 10, wherein the axial surface defines a plurality of pockets, each pocket axially aligned with to receive a respective one of the fasteners.

12. The OWC of claim 9, wherein the roller cage includes a flange extending radially inwardly therefrom to at least partially axially overlap the rolling elements, wherein the support shim includes an axial surface that contacts the flange.

13. The OWC of claim 9, wherein the support shim is made of plastic.

14. The OWC of claim 9, wherein the support shim includes an inner diameter, an outer diameter, and a plurality of grooves extending from the inner diameter and partially toward the outer diameter.

15. The OWC of claim 9, wherein the inner ring defines a second inner race, and the OWC further comprises a bearing between the inner ring and the outer race.

16. The OWC of claim 9, wherein the roller cage assembly includes a plurality of ramped surfaces, and the rolling elements are configured to travel radially inwardly and outwardly along ramped surfaces during engagement or disengagement of the OWC.

17. An assembly for a one-way clutch (OWC), the assembly comprising:

a carrier;

an outer race non-rotatably fixed to the carrier;

an inner race;

a roller cage assembly disposed radially between the inner race and outer race to enable relative rotation therebetween, the roller cage assembly having a plurality of rolling elements and an annular cage and configured to maintain the rolling elements in position, the cage including a flange extending radially inwardly such that the flange at least partially axially overlaps with a portion of the rolling elements; and a support shim having an axial surface that contacts the flange, wherein the support shim is configured to absorb axial forces transmitted through the flange.

18. The assembly of claim 17, wherein the support shim is made of plastic.

19. The assembly of claim 17, further comprising a hub and plurality of fasteners that fix the hub to the carrier, wherein the support shim has a second axial surface that contacts the fasteners.

20. The assembly of claim 17, wherein the support shim includes an inner diameter, an outer diameter, and a plurality of grooves extending from the inner diameter and partially toward the outer diameter.

* * * * *